US008055519B1

(12) United States Patent
Trobiani

(10) Patent No.: US 8,055,519 B1
(45) Date of Patent: Nov. 8, 2011

(54) SELF-SUFFICIENT HEALTHCARE COVERAGE

(75) Inventor: Steven Trobiani, Maple Grove, MN (US)

(73) Assignee: Prime Health Holdings, LLC, Woodbury, MN (US)

(*) Notice: Subject to any disclaimer, the term of this patent is extended or adjusted under 35 U.S.C. 154(b) by 425 days.

(21) Appl. No.: 12/031,523

(22) Filed: Feb. 14, 2008

(51) Int. Cl.
*G06Q 40/00* (2006.01)

(52) U.S. Cl. ............... 705/4; 705/35; 705/36 T; 705/67; 705/2; 705/14.58; 705/39; 709/205; 235/380; 235/381

(58) Field of Classification Search ....... 705/4, 35–36 T, 705/67, 2, 14.58, 39; 235/380–381; 709/205
See application file for complete search history.

(56) References Cited

U.S. PATENT DOCUMENTS

| | | | |
|---|---|---|---|
| 7,739,131 B1 * | 6/2010 | Luedtke | 705/4 |
| 2006/0149595 A1 | 7/2006 | Williams et al. | |
| 2007/0233525 A1 | 10/2007 | Boyle | |
| 2008/0208638 A1 * | 8/2008 | Davidson et al. | 705/4 |
| 2008/0306765 A1 | 12/2008 | Daniels et al. | |

OTHER PUBLICATIONS

JoAnn Davis, "Communication: It Is More Than Distributing Information," Employee Benefit Plan Review, Jul. 2007, vol. 62, Iss. 1, p. 5.*

Warren S Hersch, "The Market for COLI—Still Strong and Robust," National Underwriter, Life & Health, Jun. 12, 2006, vol. 110, Iss. 23, p. 12.*
Ruling 2002-41 and Notice 2002-45, IRS Bulletin 2002-28, Jul. 15, 2002, Internal Revenue Service, U.S. Department of the Treasury.*
"Health Reimbursement Account," Jan. 29, 2007, Wikipedia archive for http://en.wikipedia.org/wiki/Health_Reimbursement_Account.*
"U.S. Appl. No. 12/031,515, Non-Final Office Action mailed May 11, 2010", 10 Pages.
"U.S. Appl. No. 12/031,515, Non Final Office Action mailed Jan. 28, 2011", 9 pgs.
"U.S. Appl. No. 12/031,515, Response filed Oct. 11, 2010 to Non Final Office Action mailed May 11, 2010", 14 pgs.
"U.S. Appl. No. 12/031,515, Restriction Requirement mailed Nov. 26, 2010", 7 pgs.

* cited by examiner

*Primary Examiner* — Harish T Dass

(74) *Attorney, Agent, or Firm* — Schwegman, Lundberg & Woessner, P.A.

(57) ABSTRACT

Methods for self-sufficient healthcare coverage are described. Some embodiments may include receiving requests to pay healthcare claims. The money to pay these claims may be allocated from one or more healthcare-related financial account associated with employers and employees. Some healthcare-related financial accounts may be associated with investment accounts. By investing funds from a healthcare-related financial account into an investment account, at least a portion of the income from the investment account may be reallocated back to the originating healthcare-related financial account to allow it to grow. Other embodiments are described and claimed.

22 Claims, 7 Drawing Sheets

SELF-SUFFICIENT HEALTHCARE COVERAGE

BACKGROUND

Health insurance can be costly, and with rising healthcare costs, insurance premiums seem to be going nowhere but up. At the same time, deductibles are increasing as well. Some companies use claims processing systems which allocate payments on a restrictive basis and draw funds from pools generated from the premium payments of numerous customers.

BRIEF DESCRIPTION OF THE DRAWINGS

Embodiments of inventive subject matter may be best understood by referring to the following description and accompanying drawings, which illustrate such embodiments. In the drawings.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
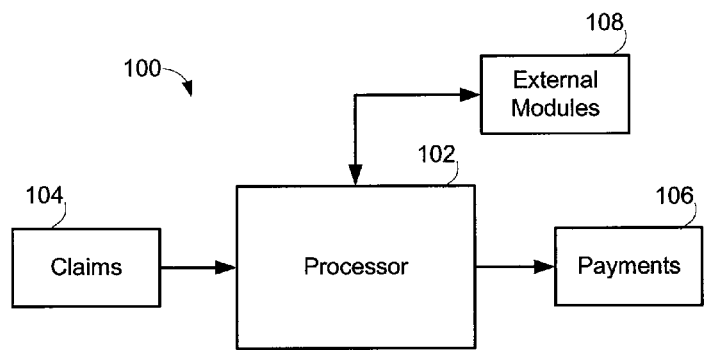
FIG. 1 is a block diagram of a claims processing system according to various embodiments.

FIG. 1 is a block diagram of a claims processing system 100 according to various embodiments. The system 100 includes a processor 102, claims 104, payments 106 and external modules 108.

The processor 102 may receive claims 104 as input. The claims 104 may be healthcare related, and may include at least a monetary value representing an amount of money to be paid for a product or service. The claims 104 may also include a description of the product or service associated with the monetary value. Example claims 104 may include charges for doctor visits, medical treatments or tests, healthcare related equipment, medicine and prescriptions, and other products or services. The processor 102 may take the input claims 104 and allocate appropriate funds to generate a payment 106 as output. A particular payment 106 may be related to a claim 104, but the payment 106 need not cover the exact amount as the monetary value in the claim 104. In some cases, the processor may generate a payment 106 which is less than the monetary value in the associated claim 104.

The external modules 108 communicate with the processor 102 to determine the source or sources of funding to be used to generate the payment 106. The external modules 108 may control or administer access to funding sources such as bank accounts, investment accounts, insurance policies, stop-loss or catastrophic loss, or other financial sources. Rules or algorithms may be set up by the processor 102 or by the external modules 108 to govern the selection and the order of access of the funding sources The rules or algorithms may also dictate minimum, maximum or other threshold amounts which coincide with the various funding sources. In short, claims 104 are input to the processor 102, which may invoke the external modules 108 to access funding to generate a payment 106 associated with the claims 104.

Figure 2:
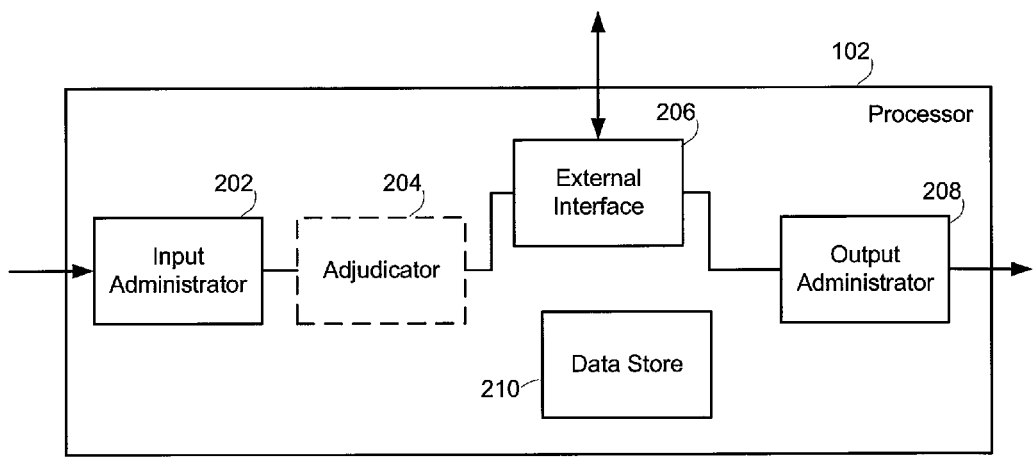
FIG. 2 is a more detailed block diagram of the processor in the claims processing system according to various embodiments.

FIG. 2 is a more detailed block diagram of the processor 102 in a claims processing system of FIG. 1 according to various embodiments. The processor 102 includes an input administrator 202, an adjudicator 204, an external interface 206, an output administrator 208 and a data store 210.

The processor 102 may receive as input, claims related to healthcare products or services. The input administrator 202 in the processor 102 may analyze the input claim to determine a number of characteristics. The input administrator 202 may determine the monetary amount of the claim, the product or service the claim is related to, a categorization based on one or both of the monetary amount or the product/service in the claim, the source of the claim, the source of the product/service, or other characteristics. These characteristics and other data may be used by the adjudicator 204 to determine if and how much of the claim is to be paid. Various rules or algorithms may be used by the adjudicator 204 to make its determinations. As an example, the adjudicator 204 may use rules which set threshold or fixed amounts to be paid for particular products and services. In some embodiments the adjudicator 204 is an optional component to the processor 102. In other embodiments, the adjudicator 204 may be an external component to the processor 102.

Once the amount of the claim to be paid is determined by the adjudicator 204 or the input administrator 102 (in the absence of the adjudicator 204), the external interface 206 may access external administrators and sources of funding. In an example embodiment, the external interface 206 may access a health savings account ("HSA") associated with the a user submitting the claim. In other embodiments, the external interface 206 may access a health reimbursement account ("HRA") (the HRA may also be know as a health reimbursement arrangement) associated with an employer of the user submitting the claim. In another embodiment, the external interface 206 may access a stop-loss or catastrophic loss policy or account associated with the user submitting the claim. The external interface 206 may access these and other accounts directly or through an administrator of one or more accounts.

Once one or more funding sources have been accessed by the external interface 206, the funding from each source may be directed to the output administrator 208 to be allocated to payment of the claim. The data acquired and generated during processing and payment of a claim may be stored in the data store 210 for archival purposes. In some embodiments, the data stored in the data store 210 may be used to generate statistical data. The statistical data may be used to create rules or algorithms to be used by the input administrator 202, the adjudicator 204, or other components of the processor 102.

Figure 3:
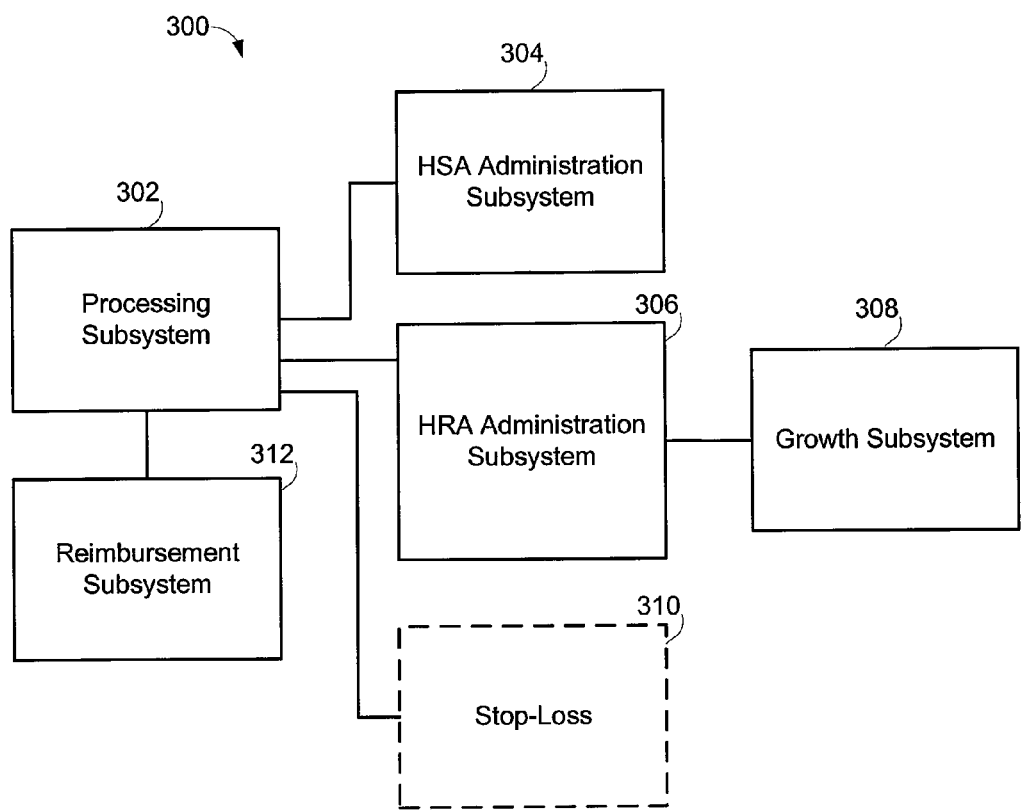
FIG. 3 is a block diagram of another claims processing system according to various embodiments.

FIG. 3 is a block diagram of another claims processing system 300 according to various embodiments. The system 300 includes a processing subsystem 302, an HSA administration subsystem 304, an HRA administration subsystem 306, a growth subsystem 308, a stop-loss device 310, and a reimbursement subsystem 312.

The processing subsystem 302 may include a processor 102 as described with regard to FIGS. 1 and 2 above, according to some embodiments. The processing subsystem 302 may be in communication with a number of external subsystems. The processing subsystem 302 may interface with one or more of the external subsystems in order to allocate funding for an incoming claim. The HSA administration subsystem 304 may administer one or more healthcare related financial accounts associated with one or more users. The financial accounts administered by the HSA administration subsystem 304 may, for example, be healthcare related savings accounts which allow users to deposit pre-tax dollars to be used for certain healthcare needs.

The HRA administration subsystem 306 may administer one or more healthcare related financial accounts associated with an employer of the user. The financial accounts administered by the HRA administration subsystem 306 may, for example, be healthcare related accounts that allow for tax-deductible reimbursement of healthcare claims related to a user/employee. The HRA administration subsystem 306 may interact with the growth subsystem 308 in order to invest funds from accounts administered by the HRA administration subsystem 306. A portion of the funds in accounts administered by the HRA administration subsystem 306 may be allocated to the growth subsystem 308 for placement into an investment vehicle or other vehicle for wealth accumulation. Interest and other income generated by the funds in the investment vehicle controlled by the growth subsystem 308 may be allocated back to accounts administered by the HRA administration subsystem 306.

The stop-loss device 310 may be associated with a user and may allow the processing subsystem 302 to access additional funding when funding is needed above a threshold amount. The stop-loss device 310 may be an optional component of the system 300. In some embodiments, the stop-loss device 310 may be an insurance policy. In other embodiments, the stop-loss device may be a savings pool. The stop-loss device 310 may be applied to an individual user as a member of a group of users. The group of users may be represented by their employ to a particular company, or their assembly within an alliance, group purchasing organization or other grouping. The stop-loss device 310 may be any financial instrument used to cover a claim or loss that exceeds a threshold amount.

Generally the processing subsystem 302 will access funding from the HSA administration subsystem 304 and the HRA administration subsystem 306 before accessing funding from the stop-loss device, but the inventive subject matter is not limited in this way. In one embodiment, the HSA administration subsystem 304 and the stop-loss 310 may not be present, and the processing subsystem 302 may only access the HRA administration subsystem 306 for funding to cover a claim.

Once funding and sources of the funding are determined, the processing subsystem 302 may forward the funding information to the reimbursement subsystem 312. The reimbursement subsystem 312 may allocate funding from the HSA administration subsystem 304, the HRA administration subsystem 306 and/or the stop-loss device in accordance with instructions from the processing subsystem 302.

Figure 4:
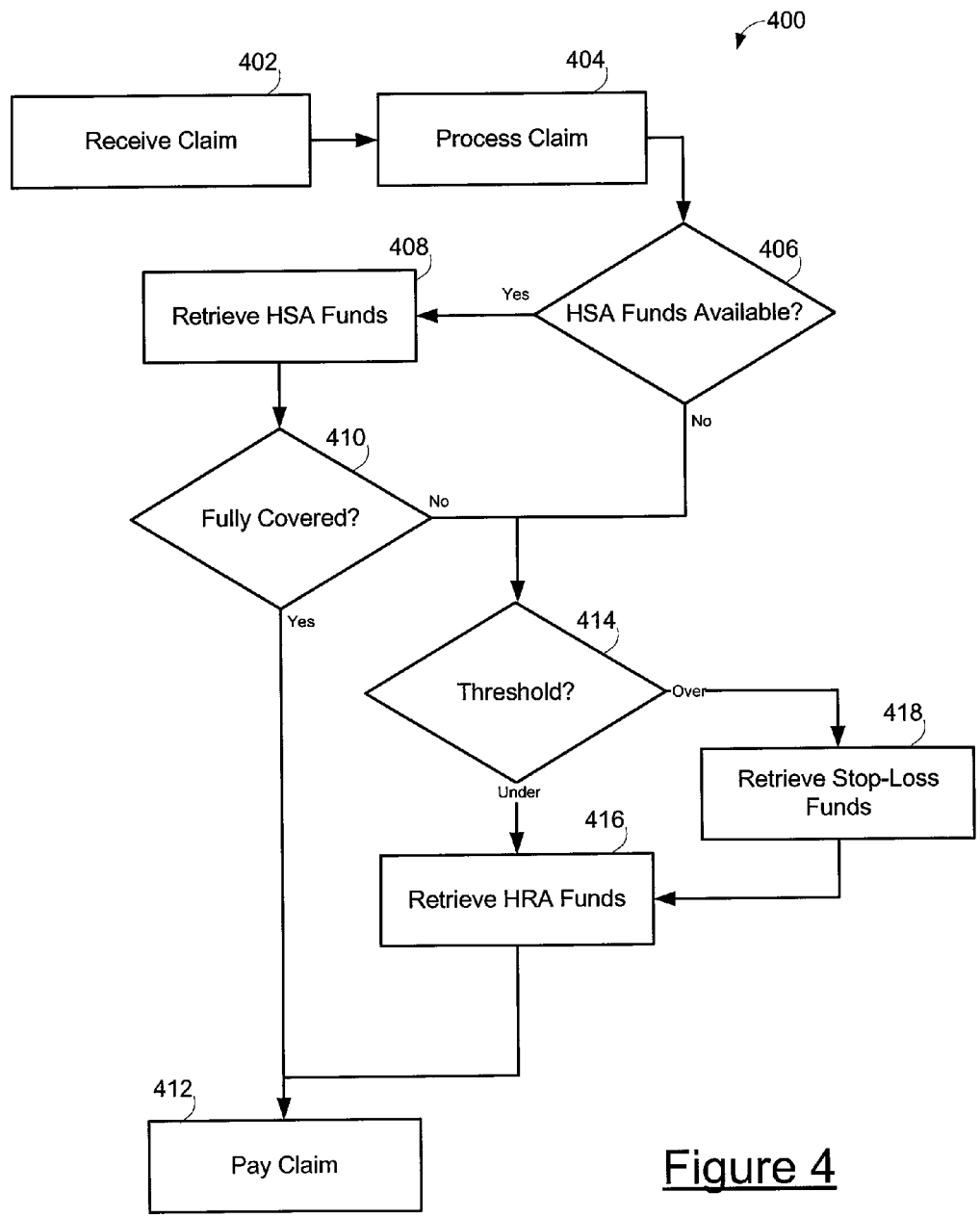
FIG. 4 is a flow diagram of a method for processing a claim according to various embodiments.

FIG. 4 is a flow diagram of a method 400 for processing a claim according to various embodiments. The method 400 begins by receiving a claim for coverage of a particular product or service (block 402). The claim may then be processed to determine characteristic data related to the claim (block 404). The characteristic data may include the amount of coverage requested, a user associated with the claim (the source of the claim), the provider of the product or service, any history associated with the user or the provider, the date of the service or purchase of the produce, date of filing of the claim, and other characteristics. Processing the claim may also include determining how much funding will be allocated to covering the claim amount, and from where the funding will come.

Multiple accounts may be available to fund coverage of the claim. An HSA may be one of these accounts. If there is an HSA associated with the user submitting the claim, a determination may be made as to whether there are funds available in the HSA to cover the claim (block 406). If there are funds available, at least a portion of those funds may be retrieved (block 408). Even though an amount of funds may be present in the HSA, not all of those funds may be available for withdrawal, and additionally, although funds may not yet be present in an HSA, additional funds may be considered available if they are expected to be deposited in a future time period. Once the available funds are retrieved, a determination may be made as to whether the retrieved funds fully cover the claim (block 410). If the retrieved funds fully cover the claim, the claim may be paid out (block 412).

If the retrieved HSA funds are not enough to fully cover the claim, a determination may be made as to whether the remainder of the claim is over a threshold amount (block 414). If the remainder amount is under the threshold amount, funds from an HRA may be retrieved to cover the remainder of the claim (block 416). The HRA may be associated with an employer of the user. The retrieved HRA and HSA funds may be used to pay out the claim (block 412). If the remainder amount is over the threshold amount (as determined in block 414), stop-loss funds may be retrieved (block 418). The stop-loss funds may come from a stop-loss policy or account associated with the user. The stop-loss policy or account may be provided to the user by an employer, a plan provider, or a group to which the user belongs. The combination of the available HSA funds, and the remainder up to the threshold amount from HRA funds, and the remainder above the threshold from the stop-loss funds may be used to pay the claim (block 412).

If there is not an HSA available (i.e. the user does not have an HSA), or if there are no HSA funds available (block 406), the determination may be made as to whether the claim exceeds a threshold amount (block 414). If the claim is under the threshold amount, HRA funds may be retrieved (block 416) in the amount of the claim, and the claim may be paid out with those funds (block 412). If the claim is over the threshold amount, the amount over the threshold may be retrieved from a stop-loss policy or account (block 418), and the amount up to the threshold may be retrieved from an HRA (block 416). The combined stop-loss and HRA funds may be used to pay out the claim 412).

Figure 5:
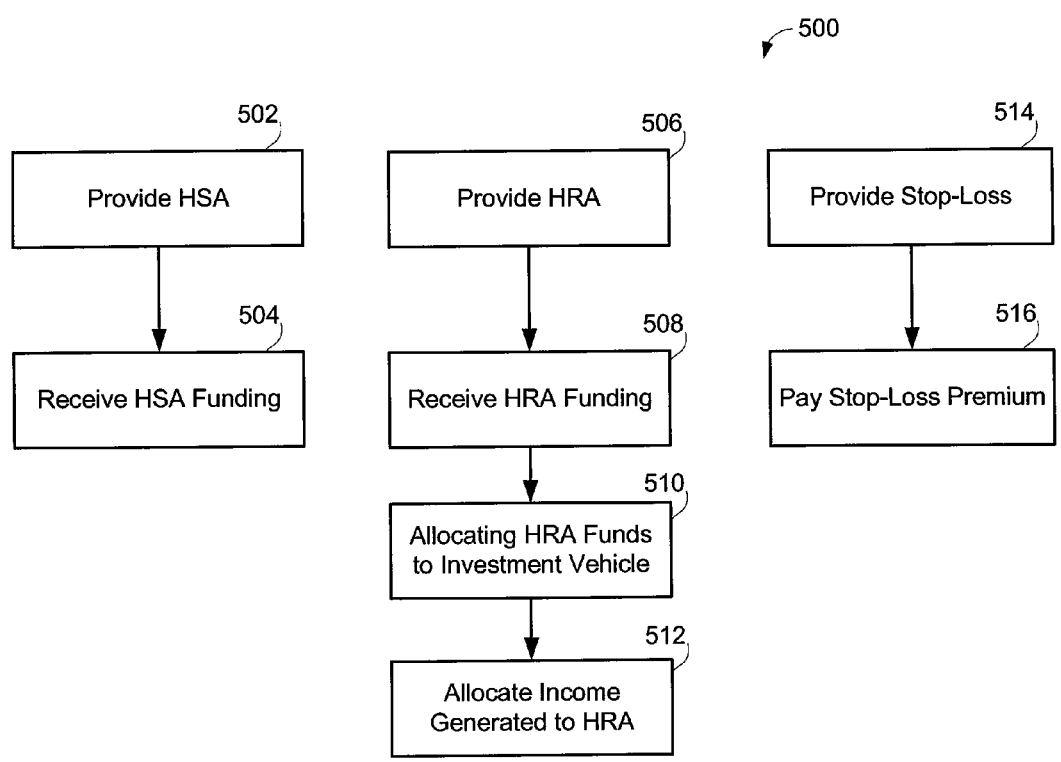
FIG. 5 is a flow diagram of a method for maintaining claims processing system funding sources according to various example embodiments.

FIG. 5 is a flow diagram of a method 500 for maintaining claims processing system funding sources according to various example embodiments. The method 500 may include providing and receiving funding for a number of financial accounts associated with users or account pooling providers. According to various embodiments, an account pooling provider may be an employer, and the user may be an employee of the employer. Maintenance of three example financial accounts are described with reference to FIG. 5.

An HSA may be provided to a user for healthcare savings purposes (block 502). The HSA may be a traditional tax-advantaged savings account allowing withdrawal for qualified healthcare related expenses, or a similar healthcare related financial account. The user may make deposits to the HSA, and the deposits may be received on a pre-tax basis (block 504). The user's deposits may be periodic (i.e. scheduled payroll deductions), or may be unscheduled. In accordance with a healthcare coverage plan implemented by an employer, an employee may be subject to mandatory deposits into the HSA. These mandatory deposits may be in the form of automatic payroll deductions. In some embodiments, limits may be set by an employee, an employer, or a governmental entity as to how much may be deposited into the HSA on a periodic basis. Additionally, a provider or employer associated with the user may make deposits to the user's HSA as well. The user may use the funds in the HSA to cover qualified healthcare costs according to some embodiments.

An HRA may be provided to an employer (or other similar account pooling provider) to be used to fund the healthcare costs of the users as employees of the employer. The HRA may be a traditional tax-advantaged account held by an employer to pay out employee healthcare costs, or a similar healthcare related financial account. The employer may make periodic or unscheduled contributions to the HRA in order to build it up as a funding source. Additionally, an employee may also make contributions to the HRA or similar healthcare related account held by the employer. Once these funds are received (block 508), they may be saved and used to pay out healthcare claims for the benefit of the employees. The employer may set limits and regulations concerning use of HRA funds by employees. Reporting mechanisms may additionally be available to the employer or a third party administrator to track employee utilization of HRA funds. At least a portion of the funds in the HRA account may also be allocated to an investment vehicle for the purposes of growing the HRA funds (block 510). Income generated by the invested HRA funds may be allocated back to the HRA to providing additional funding (block 512). At some point, the income generated by the invested HRA funds may be able to cover the employer's periodic contributions to the HRA, allowing the HRA to fund itself off of investment income. According to various embodiments, the funds in the HRA may be held in trust for the benefit of the employer and/or the employees. The invested funds from the HRA may also be held in trust. In some embodiments, the income generated by the HRA funds in the investment vehicle may be allocated to employee HSA accounts or other accounts or policies.

A stop-loss policy or account may be provided to a user, employer or group provider (i.e. an alliance or group of smaller businesses) to cover claims or losses over a threshold amount (block 5014). The stop-loss may help protect the user or employer in case of a large claim which would otherwise deplete HRA or other account funds beyond an acceptable amount. The acceptable amount may be set as the threshold used to invoke the stop-loss. The stop-loss may include a periodic premium or deposit to maintain. This premium or deposit may be paid out from contributions by the user, the employer, the group provider or from HRA funds (block 516).

Figure 6:
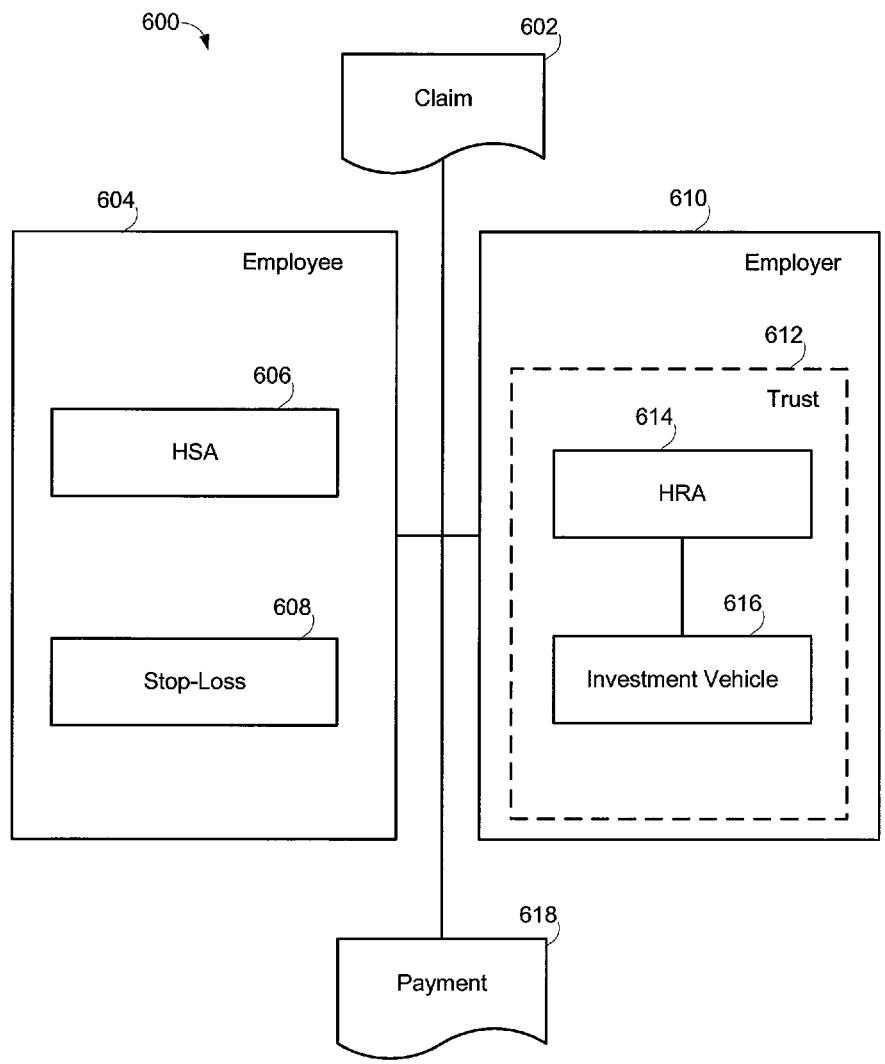
FIG. 6 is a block diagram of employee and employer characteristics in a claims processing system according to various example embodiments.

FIG. 6 is a block diagram of employee and employer characteristics in a claims processing system 600 according to various example embodiments. The system 600 includes a claim 602, an employee 604, an HSA 606, a stop-loss 608, an employer 610, a trust 612, an HRA 614, an investment vehicle 616, and a payment 618.

The employee 604 may be set up with the HSA 606 and the stop-loss policy 608. The HSA may be funded by the employee 604 or the employer 610 or both, and may be owned by the employee 604. The stop-loss policy 608 may be set up to cover claims 602 associated with the employee 604. The stop loss policy 608 may have a premium which may be paid by the employee 604 or the employer 610 or both. In some embodiments, the stop loss policy may exist to cover an aggregate number of employees.

The employer 610 may be set up with the HRA 614 to cover employee 604 healthcare costs. The HRA 614 funds may be held in the trust 612 for the benefit of the employer 610 and/or the employees 604. According to some embodiments, the funds in the HRA account may be considered equity assets of the employer, allowing the employer to borrow against those funds. A portion of the funds in the HRA 614 may be allocated to the financial vehicle 616 for wealth accumulation. Investment decisions may be made by the employer 610, an administrator of the trust 612, or another administrator. As income (i.e. interest and dividends) is earned on the funds in the investment vehicle 616, that money may be reinvested into the investment vehicle 616 or reallocated to the HRA 614.

When the employee 604 submits a claim 602, the HSA 606, HRA 614 and stop-loss policy 608 may be accessed to generate the funds to allocate to a payment 618 of the claim 602. According to various embodiments, the funds in the HSA 606 may be accessed first, followed by funds in the HRA 614. After funds have been accessed in the HSA 606, if the remainder needed to cover the claim is greater than a threshold value, the HRA 614 may provide funds up to the threshold value, and the stop-loss policy 608 may be invoked to cover the amount above the threshold value. The payment 618 may be made to the healthcare provider associated with the claim 602, or to the employee 604 if the employee 604 has already paid the healthcare provider.

Figure 7:
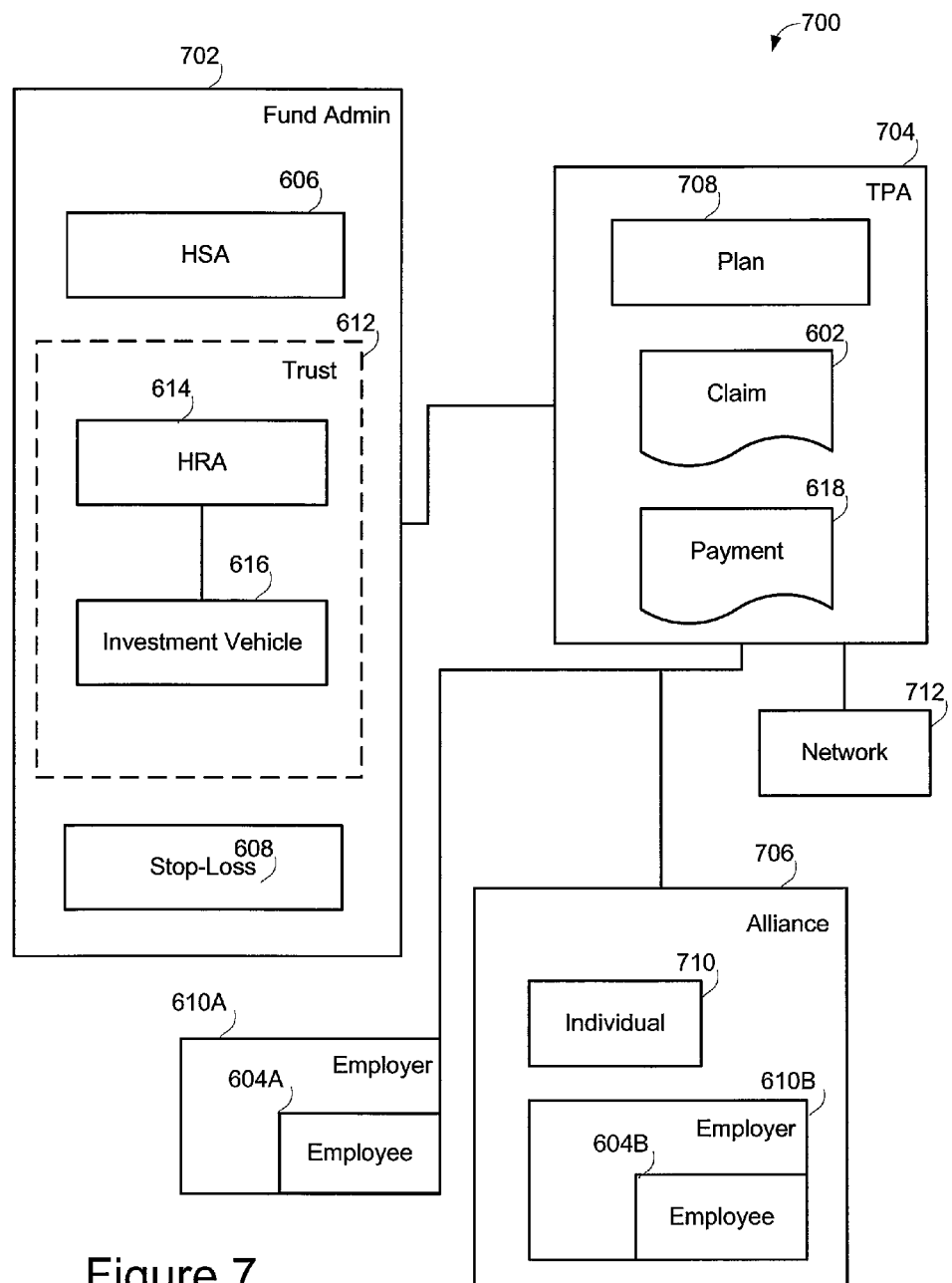
FIG. 7 is a block diagram of the characteristics of internal and external components of a claims processing system according to various example embodiments.

FIG. 7 is a block diagram of the characteristics of internal and external components of a claims processing system 700 according to various example embodiments. The system 700 includes a fund administrator 702 managing the HSA 606, the trust 612 including the HRA 614 and associated investment vehicle 616, as well as the stop-loss policy 608. The fund administrator 702 may manage the various financial accounts on behalf of an employee or employer as discussed above with respect to FIG. 6. The fund administrator 702 may receive deposits or premium payments with relation to these accounts and may interact with a third party administrator ("TPA") 740 to provide funding related to claims 602.

The TPA 704 administers healthcare coverage plans 708, and processes claims 602 and payments 618. The TPA 704 may interact with the fund administrator 702 to retrieve funds from one or more accounts or policies to cover a claims 602 and make a payment 618. The TPA 704 may include internally or may interact with an external managed care system. The managed care system may provide additional regulation on the healthcare coverage plan 708 user or healthcare provider to control cost and service quality by direct interventions either before, during or after the services are rendered. The healthcare coverage plans 708 administered by the TPA 704 may provide coverage to users. The users of the healthcare coverage plans 708 may generally be employees 604A-B associated with employers 610A-B, although an individual 710 may also be a user. The TPA 704 may be able to interact with employees 604A-B regarding their healthcare and use of their healthcare coverage plan 708. Certain reporting and details which may not be available to an employer 610A-B due to governmental regulations (e.g. the Health Insurance Portability and Accountability Act "HIPAA").

An employer 610A may interact with the TPA 704 to set up healthcare coverage plans 704 for its employees 604A. The TPA 704 may then interact with the fund administrator 702 to set up HSAs 606 one or more stop-loss policies 608 for the employees 604A and an HRA 614 for the employer 610A. The HRA 614 may be held in a trust 612 and may include a linked investment vehicle 616 for investing a portion of the HRA 614 funds. The more funds that are available in the HRA 614, the more that can generally be allocated into the investment vehicle 616. In some embodiments, for smaller businesses, funding the HRA 614 enough to comfortable replace health insurance may be difficult. An alliance 706 may be formed to group employers 610B together to share stop-loss policy 608 coverage. Each employer 610B within the alliance 706 may have the fund administrator 702 set up separate HRAs 614 (in trust 612 and including the linked investment vehicle 616 as well). The alliance 704 may act as an umbrella company for the employers 610B and employees 604B within the alliance 706. Additionally, individuals 710 may also be part of an alliance to get the benefit of the HRA 614 or a similar financial account for healthcare claim coverage. The alliance 706 may additionally act as a group purchasing organization ("GPO"), allowing member employers 610B, employees 604B and individuals 710 to take advantage of group purchasing opportunities. The group purchasing opportunities offered by the alliance 706 may provide lower cost goods due to higher quantities purchased.

The physicians network 712 may interact and be regulated by the TPA 704 in accordance with the healthcare coverage plans 708. The physicians network 712 may consist of a number of healthcare providers who agree upon particular fee schedules for products and services to be provided to the users of the healthcare coverage plans 708. This allows employees 604A-B and individuals 710 to go to a go to a physician in the physicians network 712 and to receive products or treatment. A claim may be filed and subsequently paid according to the discounted to fee schedule.

The three major entities in FIG. 7, the fund administrator 702, the TPA 704 and the alliance 706 may be combined in a number of ways within one or more larger administrative entities. According to an example embodiment, the TPA 704 and the alliance 706 may be one entity providing healthcare coverage plans 708, processing claims and allowing for grouped access to stop-loss policies and purchasing programs. Additionally, the fund administrator 702 and the TPA 704 may be administered together to provide one source for the healthcare coverage plans 708, claims processing, as well as the accounts to be used to fund the plans. Singularly, or combined, the fund administrator 702, the TPA 704 and the alliance 706 may be implemented my an insurance company, a health maintenance organization ("HMO"), or other healthcare finance related organization.

According to various embodiments, the implementation of the healthcare coverage plans 708, including claims processing and account management may be regulated or administered using computer software, or instructions stored on a machine readable medium.

Use of the terms "user" or "employee" with respect to healthcare accounts, policies or claims should be construed to cover not only the individual user or employee, but also any family, relative or other individuals also covered by the user's or employee's healthcare plan or policy.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed below regarding FIG. 8.

Figure 8:
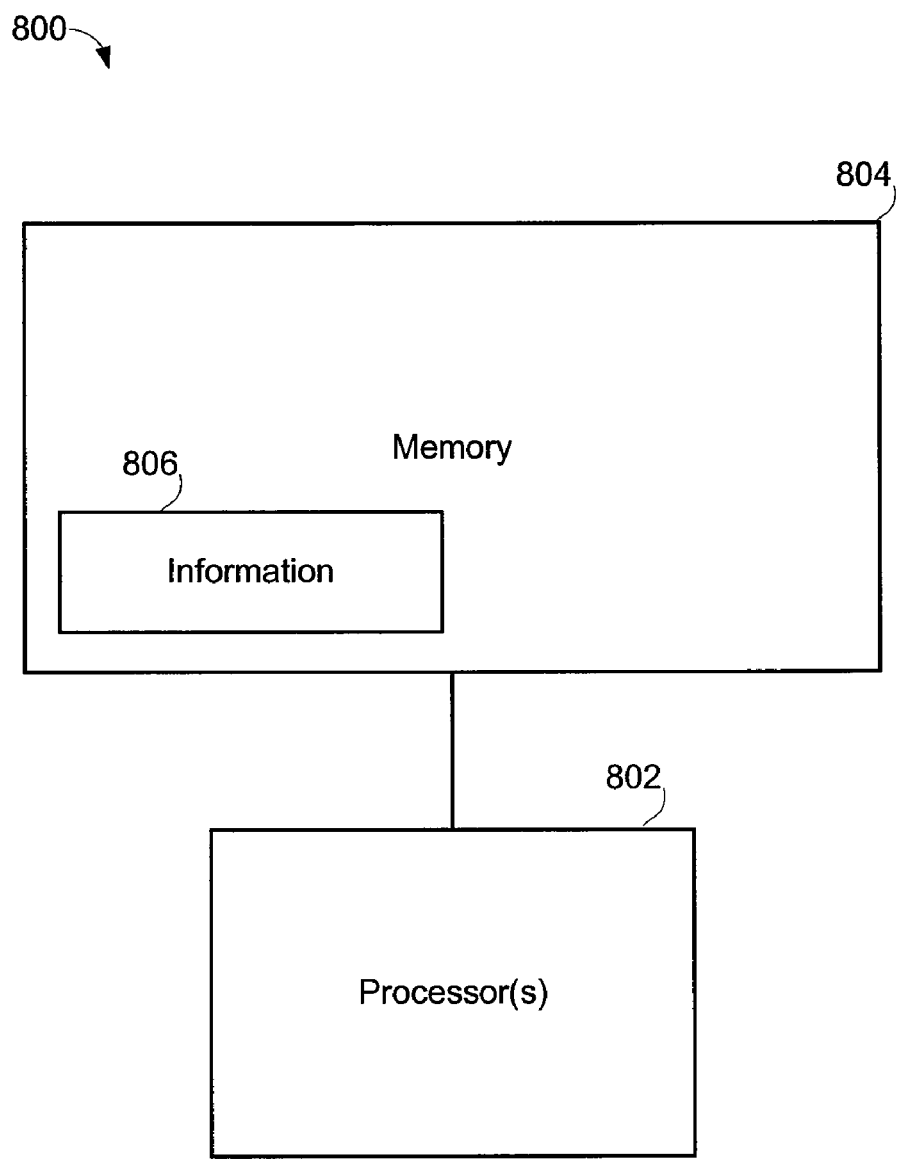
FIG. 8 is a block diagram of an article according to various embodiments.

FIG. 8 is a block diagram of an article of manufacture ("article") 800 according to various embodiments. Such embodiments may comprise a computer, a memory system, a magnetic or optical disk, some other storage device, or any type of electronic device or system. The article 800 may include one or more processor(s) 802 coupled to a machine-accessible medium such as a memory 804 (e.g., a memory including electrical, optical, or electromagnetic elements). The medium may contain associated information 806 (e.g., computer program instructions, data, or both) which, when accessed, results in a machine (e.g., the processor(s) 802) performing the activities previously described herein.

Implementing the apparatus, systems, and methods disclosed herein provide a useful, concrete, and tangible result by identifying activity to be investigated for insurance fraud using computer automated operations and by facilitating the referral of a claim to an individual in an investigation unit to begin the investigation process. This approach decreases the dependency on manual and/or ad hoc detection of potential fraud and in some cases enables earlier detection of activity to be investigated for fraud than possible with manual or ad hoc methods.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. A method comprising:
   receiving a request from a user to pay a healthcare claim for a claimed amount;

allocating funding, using one or more computers, from a first healthcare related financial account owned by the user to pay at least a portion of the claimed amount; and allocating funding, using the one or more computers, from a second healthcare related financial account held by an employer of the user to pay at least a portion of the claimed amount, the second healthcare related financial account being associated with an investment account, wherein at least portion of the second healthcare related financial account is allocated into the investment account and at least a portion of the income from the investment account is allocated to the second healthcare related financial account.

2. The method of claim 1, wherein the first healthcare related financial account is a Health Savings Account (HSA).

3. The method of claim 1, wherein the second healthcare related financial account is a Health Reimbursement Account (HRA), wherein the HRA is an employer owned account to payout employee health care costs, and wherein the HRA has a tax advantage for the employer such that employer contributions to the HRA are tax-deductible.

4. The method of claim 1, further comprising allocating funding from a stop-loss account if the claimed amount is above a threshold amount, wherein the stop-loss account protects the employer.

5. The method of claim 1, further comprising adjusting the claimed amount and allocating funding from the first healthcare related financial account and the second healthcare related financial account based on the adjusted claimed amount.

6. The method of claim 5, further comprising determining a price schedule associated with a network of healthcare providers adjusting the claimed amount based on the price schedule.

7. The method of claim 1, further comprising providing a healthcare coverage plan to a user, wherein the funding allocated from the first healthcare related financial account and the funding allocated from the second healthcare related financial account is based on the healthcare coverage plan.

8. A method comprising:
   administering, using one or more computers, a healthcare related financial account in the name of an employer, the healthcare related financial account including funds configured to payout employee healthcare costs;
   allocating, using the one or more computers, at least a portion of the funds in the healthcare related financial account into an investment vehicle;
   receiving income generated by the investment vehicle for the healthcare related financial account; and
   using, by the one or more computers, the income generated by the investment vehicle to cover the employer's periodic contributions to the healthcare related financial account.

9. The method of claim 8, wherein the healthcare related financial account is an HRA, wherein the HRA is an employer owned account configured to payout employee health care costs, and wherein the HRA has a tax advantage for the employer such that employer contributions to the HRA are tax-deductible.

10. The method of claim 8, wherein the employee healthcare costs include a healthcare claim made by an employee of the employer.

11. The method of claim 8, wherein administering the healthcare related financial account includes holding the healthcare related financial account in a trust.

12. The method of claim 8, further comprising associating with a stop-loss policy to protect the funds in the healthcare related financial account over a threshold amount, and wherein the stop-loss policy protects the employer.

13. The method of claim 12, further comprising allocating a portion of the funds in the healthcare related financial account to pay a premium on the stop-loss policy.

14. A method comprising:
   providing a plurality of personal healthcare related financial accounts to a plurality of users, the users being associated with a provider;
   providing a group healthcare related financial account held by the provider;
   receiving funding for the personal healthcare related financial accounts from at least a portion of the users;
   receiving funding for the group healthcare related financial account from the provider;
   allocating at least a portion of the group healthcare related financial account to a financial vehicle to earn interest;
   allocating, using one or more processors, at least a portion of the earned interest from the portion of the group healthcare related financial account allocated to the financial vehicle to the group healthcare related financial account, the at least a portion of the earned interest to cover the provider's periodic contributions to the group healthcare related financial account;
   allocating funding, using one or more computers, from a personal healthcare related account provided to a user submitting a healthcare claim for a claimed amount to pay at least portion of the claimed amount; and
   allocating funding, using the one or more computers, from the group related healthcare related financial account to pay at least portion of the claimed amount.

15. The method of claim 14, further comprising providing a stop-loss account, the stop-loss account including a threshold value to determine when the stop-loss account is accessed to pay at least a portion of the claimed amount, wherein the stop-loss account protects the provider.

16. The method of claim 15, further comprising associating with a group of employers and associating the stop-loss account to the employees of the employers.

17. The method of claim 15, wherein the stop-loss account is an insurance policy.

18. The method of claim 15, wherein the portion of the group healthcare related financial account allocated to the financial vehicle is determined based substantially on the number of users multiplied by the threshold value subtracted from a total amount of funds in the group healthcare related financial account.

19. The method of claim 18, wherein the portion of the group healthcare related financial account allocated to the financial vehicle further includes an amount of funds related to the funds in the personal healthcare related financial accounts associated with each user.

20. The method of claim 18, wherein the portion of the group healthcare related financial account allocated to the financial vehicle further includes an amount of funds related to a risk determination.

21. An article of manufacture comprising a machine-readable medium storing instructions for processing claims, which when executed by a machine, cause the machine to:
   process a request from a user to pay a healthcare claim for a claimed amount;
   allocate funding from a first healthcare related financial account owned by the user to pay at least a portion of the claimed amount; and
   allocate funding, using one or more computers, from a second healthcare related financial account held by an employer of the user to pay at least a portion of the claimed amount, the second healthcare related financial account being associated with an investment account, wherein at least portion of the second healthcare related financial account is allocated into the investment account and at least a portion of the income from the investment account is allocated to the second healthcare related financial account.

22. An article of manufacture comprising a machine-readable medium storing instructions for processing claims, which when executed by a machine, cause the machine to:

administer a healthcare related financial account in the name of an employer, the healthcare related financial account including funds configured to payout employee healthcare costs;

allocate at least a portion of the funds in the healthcare related financial account into an investment vehicle;

process income generated by the investment vehicle for deposit into the healthcare related financial account; and using the income generated by the investment vehicle to cover the employer's periodic contributions to the healthcare related financial account.

\* \* \* \* \*